United States Patent

Ganesh et al.

[11] Patent Number: 5,915,473
[45] Date of Patent: Jun. 29, 1999

[54] INTEGRATED HUMIDITY AND TEMPERATURE CONTROLLER

[75] Inventors: Radhakrishna Ganesh, Onalaska, Wis.; Thomas J. Clanin, La Crescent, Minn.; David M. Foye, La Crosse, Wis.

[73] Assignee: American Standard Inc., Piscataway, N.J.

[21] Appl. No.: 08/790,407

[22] Filed: Jan. 29, 1997

[51] Int. Cl.⁶ .................. F24F 3/14; F24F 6/00; F25B 49/00; B01F 3/02

[52] U.S. Cl. .............. 165/222; 165/230; 236/44 C; 236/49.3; 62/176.6

[58] Field of Search .................. 236/44 C, 44 A, 236/44 R, 49.3; 62/176.6; 165/222, 223, 225, 228, 230

[56] References Cited

U.S. PATENT DOCUMENTS

| | | | |
|---|---|---|---|
| 2,438,120 | 3/1948 | Freygang | 62/6 |
| 3,469,412 | 9/1969 | Giuffre | 62/173 |
| 4,003,729 | 1/1977 | McGrath | 62/93 |
| 4,105,063 | 8/1978 | Bergt | 165/21 |
| 4,271,898 | 6/1981 | Freeman | 165/16 |
| 4,350,023 | 9/1982 | Kuwabara et al. | 62/176 |
| 4,540,118 | 9/1985 | Lortie et al. | 236/44 |
| 4,659,009 | 4/1987 | Newell, III | 236/44 |
| 4,850,198 | 7/1989 | Helt et al. | 62/93 |
| 4,889,280 | 12/1989 | Grald | 236/44 |
| 4,942,740 | 7/1990 | Shaw et al. | 62/93 |
| 5,000,382 | 3/1991 | Stedman | 236/46 |
| 5,114,070 | 5/1992 | Lilja et al. | 236/49.3 |
| 5,129,234 | 7/1992 | Alford | 62/176 |
| 5,224,648 | 7/1993 | Simon et al. | 236/51 |
| 5,228,302 | 7/1993 | Eiermann | 62/90 |
| 5,237,826 | 8/1993 | Baldwin et al. | 62/77 |
| 5,261,251 | 11/1993 | Galiyano | 62/176 |
| 5,276,630 | 1/1994 | Baldwin et al. | 364/505 |
| 5,305,822 | 4/1994 | Kogetsu | 165/12 |
| 5,311,451 | 5/1994 | Barrett | 364/550 |
| 5,346,129 | 9/1994 | Shah et al. | 236/44 |
| 5,390,206 | 2/1995 | Rein et al. | 375/1 |
| 5,419,146 | 5/1995 | Sibik et al. | 62/115 |

FOREIGN PATENT DOCUMENTS

WO9322602  11/1993  WIPO.

*Primary Examiner*—Ira S. Lazarus
*Assistant Examiner*—Lance Chandler
*Attorney, Agent, or Firm*—William J. Beres; William O'Driscoll; Peter D. Ferguson

[57] ABSTRACT

A method of operating an HVAC system having an HVAC control and a humidity limiting control. The method comprises the steps of: determining a relative humidity limit for a space; monitoring relative humidity in the space; comparing the relative humidity to the relative humidity limit; operating the conventional HVAC control if the space humidity does not exceed the humidity limit; and integrating the HVAC control and dehumidification controls if the space conditions require humidity limiting action.

47 Claims, 7 Drawing Sheets

INTEGRATED HUMIDITY AND TEMPERATURE CONTROLLER

BACKGROUND OF THE INVENTION

The present invention is directed to a humidity limiting mode of operation for heating, ventilating and air conditioning systems. More specifically, the humidity limiting mode of operation is initiated whenever relative humidity is greater than a relative humidity limit. The humidity limiting mode of operation will operate in the traditional deadband between the heating and cooling temperature setpoints, or will otherwise operate when the temperature versus the temperature setpoint is considered to meet the temperature control requirements. In addition to humidity, the humidity limiting mode of operation is controlled based on a zone condition such as temperature or dewpoint so as to integrate the temperature or dewpoint control with the humidity limiting control.

Dehumidification reduces relative humidity by removing water from air while maintaining a constant temperature. Relative humidity control is a broader control which includes dehumidification but also recognizes that the relative humidity can be limited by increasing air temperature even if the amount of water vapor in the air does not change.

When dehumidification was needed in previous systems, an air conditioning system was operated until a relative humidity was less than a relative humidity setpoint. Separately, the air conditioning temperature control maintained a temperature within a setpoint limit or limits. The dehumidification control and the temperature control were entirely distinct, but permitted either unwanted interactions in continuous-type controls or unwanted responses in humidistat-type controls. For instance, existing continuous controls allow both heating and cooling to be simultaneously called for. This allows the HVAC unit to operate in a dehumidification mode but potentially without effective dehumidification since the simultaneous heating and cooling cannot guarantee that moisture removal, dewpoint control or dehumidification is occurring particularly when cooling capacity operates at intermediate levels. An integrated control is desirable where the temperature and dehumidification controls are integrated, where the transitions between the modes of operation are smooth, and where the interactions between the temperature and humidification controls are managed. Some facets of the present invention include the use of equipment heating and cooling capacities appropriate to operating needs and at pre-determined initial operating levels when transitions between modes are required. This minimizes transient deviations from desired conditions and the resulting added energy expense.

More specifically, previous systems use a thermostat for cooling control with some peripheral dehumidification, and use a humidistat for dehumidification control with reheat added to avoid subcooling. The thermostatic reheat control normally operates when a zone heating load becomes apparent from the operating cooling capacity for dehumidification. The thermostat and the humidistat operate independently without any integrated control. In previous systems, there is no automatic selection of reducing relative humidity with heat versus reducing relative humidity with cooling; there is no smoothing of the transition between the modes of operation; and there is no maintenance of zone occupant comfort by minimizing zone temperature fluctuations. Generally, the air conditioning control in previous systems does not operate in the deadband between the heating setpoint and the cooling setpoint.

In the case of unoccupied buildings, the setpoint is often changed from an occupied setpoint to a more energy conservative unoccupied setpoint thereby activating the HVAC system less often. However, drift or lack of control in the deadband can allow the space temperature and relative humidity to move well away from the setpoint, at a significant later energy penalty.

In the present invention, control sequences implement the use of cooling and heating capacity according to both sensible temperature and relative humidity conditions. Integrated control of both parameters avoids several energy wasting conditions which are produced by non-coupled, single parameter dependent dehumidification control schemes. Energy wasting effects include use of heating and cooling capacity when cooling capacity is operating above dewpoint temperature which therefore do not dehumidify, and use of heating and cooling capacity when dry bulb zone conditions are not near the desired setpoint.

SUMMARY OF THE INVENTION

It is an object, feature and advantage of the present invention to solve the problems of the prior art.

It is an object, feature and advantage of the present invention to limit relative humidity to a user established limit while maintaining temperature control.

It is an object, feature and an advantage of the present invention to integrate the control of relative humidity with the control of another parameter. The contemplated parameters include a zone or area temperature, a zone or area dewpoint, the entering water temperature produced by a chiller system such as incorporated by reference U.S. Pat. No. 5,419,146, and supplied to air handling means, or zone or area occupancy. Such integration means that relative humidity will be controlled while maintaining the parameter at a setpoint or within an acceptable range or set of conditions.

It is an object, feature and advantage of the present invention to maintain a set of conditions rather than meet an operating point. This is less severe on equipment and has a damping function so that the system is not over-responsive and so that interaction between controlled variables is managed.

It is an object, feature and advantage of the present invention to maintain the dry bulb temperature while allowing humidity to float within a range. No attempt is made to maintain control of both dry bulb and relative humidity to fixed setpoints at any point on the psychrometric chart.

It is an object, feature and advantage of the present invention to satisfy ventilation, temperature and relative humidity requirements.

It is an object, feature and advantage of the present invention to coordinate dry bulb temperature control and relative humidity control so as to minimize zone temperature fluctuations.

It is an object, feature and advantage of the present invention to achieve satisfactory transition between occupied and unoccupied heating and cooling modes of operation without abrupt changes in zone conditions.

It is a further object, feature and advantage of the present invention to minimize mode cycling and rapid transitions between modes of operation to thereby increase equipment life.

It is an object, feature and advantage of the present invention to integrate zone dehumidification and zone temperature modes of operation.

It is a further object, feature and advantage of the present invention to avoid disruptions of the controlled variables in the space being controlled.

It is a further object, feature and advantage of the present invention to operate an air conditioning control in the deadband between the heating and cooling setpoints.

It is an object, feature and advantage of the present invention to provide a humidity limiting mode of operation whenever relative humidity exceeds a relative humidity limit without regard to heating and cooling conventional modes of operation.

It is an object, feature and advantage of the present invention to minimize energy usage in the coordinated dehumidification and temperature control mode.

It is an object, feature and advantage of the present invention to control a humidity limiting mode of operation based on a first zone condition such as the humidity level and a second zone condition such as zone temperature or zone dewpoint.

It is a further object, feature and advantage of the present invention to control a humidity limiting mode of operation based on the entering water temperature of a hydronic zone cooling system.

It is a further object, feature and advantage of the present invention to provide switching between modes of operation based on dewpoint.

It is a further object, feature and advantage of the present invention that such dewpoint switching is energy efficient even if the zone is out of control since the cooling mode of operation is always first and reheat occurs only if necessary.

It is an object, feature and advantage of the present invention to provide a dewpoint control which guarantees that moisture is removed from the air.

It is an object, feature and advantage of the present invention to provide a dehumidification mode of operation which is not intensive in dewpoint computations.

It is an object, feature and advantage of the present invention to limit relative humidity to a user established limit and maintain zone temperature control so as to avoid bacterial and fungal growth.

It is an object, feature and advantage of the present invention to maintain dry bulb temperature control in a zone, with no abrupt changes, while limiting relative humidity to a user established limit.

It is a further object, feature and advantage of the present invention to operate an air conditioning system during unoccupied times to limit zone relative humidity while maintaining temperature fluctuations between high and low limits and thereby reducing energy consumption.

The humidity limiting mode of operation is entered whenever the monitored relative humidity is greater than the relative humidity limit. Dehumidification or humidity limiting action is controlled in response to both a first criteria such as the relative humidity limit and a second criteria such as zone temperature or zone dewpoint. Further, the humidity limiting mode of operation is implemented by heating or by cooling depending upon the zone conditions. Generally, the initial humidity limiting mode of operation will be the same as the mode of operation in effect prior to the initiation of humidity limiting control. For example, the transition from heating to humidity limiting control will result in relative humidity control by heating where heating is operated to maintain a humidity limit setpoint HLSP. Similarly, the transition from the cooling mode of operation to the humidity limiting mode of operation results in dehumidification by operating the HVAC system to cool. The dehumidification by cooling mode maintains a zone condition at or below the humidity limit setpoint HLSP. In the case of cooling, the temporary temperature limit setpoint is set to equal the cooling setpoint. The temporary temperature setpoint for humidity control by heating is preferably modified over time to approach a value such as the cooling setpoint. With respect to reducing relative humidity by heating, humidity control by heating can handle some dehumidification by raising the temperature out of the area where dehumidification by cooling and reheat may be unnecessary or ineffective. Dehumidification by cooling can be ineffective when the temperature of chilled water used for cooling approaches the dewpoint of entering air.

The present invention provides a method of operating an HVAC system having an HVAC temperature control and a humidity limiting control. The method comprises the steps of: determining a relative humidity limit for a space; monitoring relative humidity in the space; comparing the relative humidity to the relative humidity limit; operating the conventional HVAC control if the relative humidity does not exceed the relative humidity limit; and integrating the HVAC control and humidity limiting controls if relative humidity limiting action is required.

The present invention further provides a method of controlling humidity in a space. The method comprises the steps of: determining a relative humidity limit and a space relative humidity; initiating humidity control if the relative humidity is greater than the relative humidity limit; and limiting humidity using the heating mode of operation and the humidity limit setpoint if the mode of operation for the zone is heating.

The present invention also provides a method of switching between heating, cooling and humidity limiting modes of operation in an HVAC system. The method comprises the steps of: monitoring zone temperature and zone relative humidity; determining the zone relative humidity limit and the zone cooling setpoint; determining a dewpoint limit from the cooling setpoint and the relative humidity limit; determining a zone dewpoint from the monitored zone temperature and the monitored relative humidity; establishing a humidity limiting mode of operation if the relative humidity is greater than or equal to the relative humidity limit; and maintaining various modes of operation based upon the zone dewpoint setpoint while limiting humidity.

The present invention also provides a method of controlling an HVAC system comprising the steps of: determining an active setpoint; monitoring a condition to be controlled; comparing the active setpoint with the monitored condition to determine a condition error; using the condition error to determine a discharge temperature setpoint; determining a discharge air temperature; comparing the discharge temperature setpoint to the discharge temperature to determine a discharge temperature error; using the discharge temperature error to control the capacity of the HVAC system; and substituting the active setpoint for the discharge temperature setpoint whenever the monitored condition is not available.

The present invention further provides a method of controlling an HVAC system comprising the steps of: determining an active setpoint; monitoring a condition to be controlled; comparing the active setpoint with the monitored condition to determine a condition error; using the condition error to determine a discharge temperature setpoint; determining a discharge air temperature; comparing the discharge temperature setpoint to the discharge temperature to determine a discharge temperature error; using the discharge temperature error to control the capacity of the HVAC system if the discharge temperature is available; and using the condition error to determine a capacity for the air conditioning system if the discharge temperature is not available.

The present invention yet further provides an integrated humidity and air conditioning system conditioning air by heating or cooling. The system comprises: a humidity sensor; air conditioning means; a zone condition sensor; and a controller operably connected to the humidity sensor, the air conditioning means and the zone condition sensor. The controller is operable to control the air conditioning means in response to the sensed zone condition and the sensed humidity. The controller includes at least first, second, third, fourth and fifth control modes, a humidity limit, a first zone condition limit, and a second zone condition limit. The first control mode is operable when the zone condition is greater than the first zone condition limit and the sensed humidity is less than the humidity limit. The first control mode operates the air conditioning means to condition air by cooling in response to the sensed zone condition. The second control mode is operable when the sensed zone condition is greater than the first zone condition limit and the sensed humidity is greater than the humidity limit. The second control mode operates the air conditioning means to condition air by cooling in response to the sensed humidity and the sensed zone condition. The third control mode is operable in response to the sensed zone condition being less than the second zone condition limit and the sensed humidity being less than the humidity limit. The third control mode operates the air conditioning means by heating in response to the sensed zone condition. A fourth control mode is operable when the zone condition is less than the second zone condition limit and the humidity is greater than the humidity limit. The fourth control mode operates the air conditioning means by heating in response to the sensed humidity and the sensed zone condition. The fifth control mode is operable in response to the sensed zone condition being greater than the second zone condition limit and less than the first zone condition limit and the sensed humidity being greater than the humidity limit. The fifth control mode operates the air conditioning means by either heating or cooling in response to both the sensed humidity and the sensed zone condition.

The present invention still further provides a humidity control system. The system comprises: air handler; a humidity sensor; a temperature sensor; a controller operably connected to the air handler, the humidity sensor, and the temperature sensor. The controller includes a heating setpoint, a cooling setpoint, and a humidity limit. The controller is operable, whenever the humidity exceeds the humidity level and the temperature is less than the cooling setpoint, to control relative humidity using the air handler. The controller establishes a temporary setpoint initially at the measured temperature and controlling the air handler to reduce the relative humidity while maintaining the temporary setpoint.

BRIEF DESCRIPTION OF THE DRAWINGS

FIG. 4a shows a cascade control.

DETAILED DESCRIPTION OF THE DRAWINGS

Figure 1:
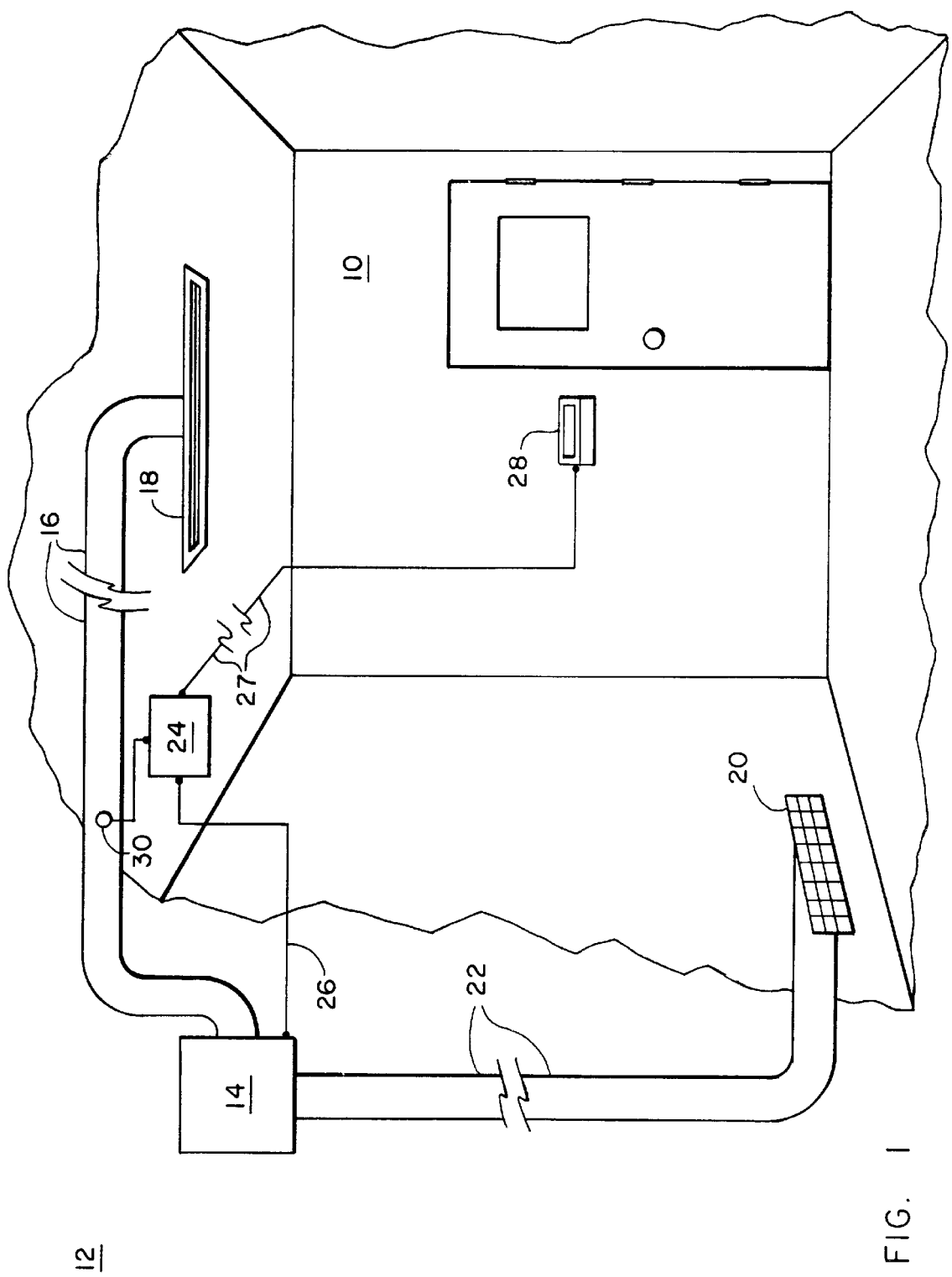
FIG. 1 is a perspective view of a zone with a block diagram of an HVAC system controlling its environmental condition.

FIG. 1 is a drawing of a zone or space 10 whose air is conditioned by an HVAC system 12. For purposes of the present application, zone control refers to both zone temperature responsive control and to cascade control where discharge air temperature or zone air temperature may be the controlling parameter. Where discharge air temperature is the unit controlling parameter, zone air conditions are implied by discharge air operating conditions.

The HVAC system 12 is conventional in nature and can include a water chiller system such as shown by U.S. Pat. No. 5,419,146. This patent is assigned to the assignee of the present invention and is hereby incorporated by reference. In contrast to this patent and for purposes of the present invention, entering water temperature as used herein shall refer to the leaving water temperature referenced in this patent. Other suitable chiller systems are sold by The Trane Company, a division of American Standard Inc., under the trademarks CenTraVac®, Horizon™ and Series R®. Although discussed in terms of chiller systems, the invention is generally applicable to air conditioning systems and products including residential and commercial systems such as those sold by the assignee under the trademarks Voyager™, Odyssey™, Climate Changer®, Thermachill™ and Trane®. These systems and their alternatives shall collectively be referred to as "air conditioning means" for purposes of this application.

The HVAC system 12 preferably includes an air handler 14 such as sold by The Trane Company under the trademark Climate Changer®. The air handler 14 controls the temperature of air and supplies that conditioned air by way of supply air ductwork 16 to the space 10. Typically, the supply air enters through a diffuser 18 where the air circulates through the space 10. A return air duct 20 retrieves air from the space 10 and returns air to the air handler 14 by means of return ductwork 22 to repeat the cycle. Although the air conditioning device is shown as an air handler 14, the applicant contemplates that any conventional air conditioning unit including, but not limited to, water source heat pumps, unit ventilators, residential units, central station air handlers, terminal units, fan coils, self contained units, field built up systems, and other units can be used to satisfy the air conditioning needs of the space 10. These air conditioning devices and their alternatives shall collectively be referred to as "air handling means" for purposes of this application. The air handling means preferably conditions air using a liquid or hydronic refrigerant provided by the air conditioning means, the refrigerant having an entering temperature referred to, for purposes of the hydronic air handlers means, as an entering water temperature.

A controller 24 controls the operation of the air handler 14 by means of an electrical line 26. The controller 24 controls the air handler 14 in response to various criteria reported to the controller 24 including those from one or more conventional zone sensors or thermostats such as that shown by device 28. The operation of the controller 24 is subsequently discussed with regard to FIG. 4. Various controllers, thermostats and sensors are sold by The Trane Company under the trademarks UCPII, TUC and Trane. Familiarity with such controllers and with psychrometric charts is assumed.

The device 28 includes controls to allow a user to enter (a) a user temperature setpoint for cooling (CSP), (b) a user temperature setpoint for heating (HSP) and (c) a relative humidity limit setpoint (HLSP). A zone temperature sensor and a zone relative humidity sensor are preferably located in the space 10 as part of the device 28 as shown in FIG. 1, but can be located in a representative location such as the return air duct 20. The device 28 is conventionally connected to the controller 24 by electrical wiring 27. The connection between the device 28 and the controller 24 can also be by wireless communications such as shown in U.S. Pat. Nos. 5,114,070 to Lilja et al.; 5,224,648 to Simon, deceased, et al.; and 5,390,206 to Rein et al., all commonly assigned to the assignee of the present invention and hereby incorporated by reference. Although the device 28 is referred to as a single unit for expediency, in practice each component can be implemented as a separate physical device or devices including separate sensors and setpoint or limit entering devices, as part of a building automation system, or as a part of a personal computer system. Suitable building automation systems are sold by The Trane Company under the trademark Tracer®.

A discharge air temperature sensor 30 measures the discharge air temperature of the air handler 14 at a representative location in the supply air ductwork 16. The air handler 14 is typically controlled by the controller 24 in response to the discharge air temperature as reported from the discharge air sensor 30 by an electrical connection 32. The air handler 14 will supply heated and cooled air to the space 10 to meet the user setpoints or limits entered on device 28 and in response to discharge air setpoints in the controller 24.

Figure 2:
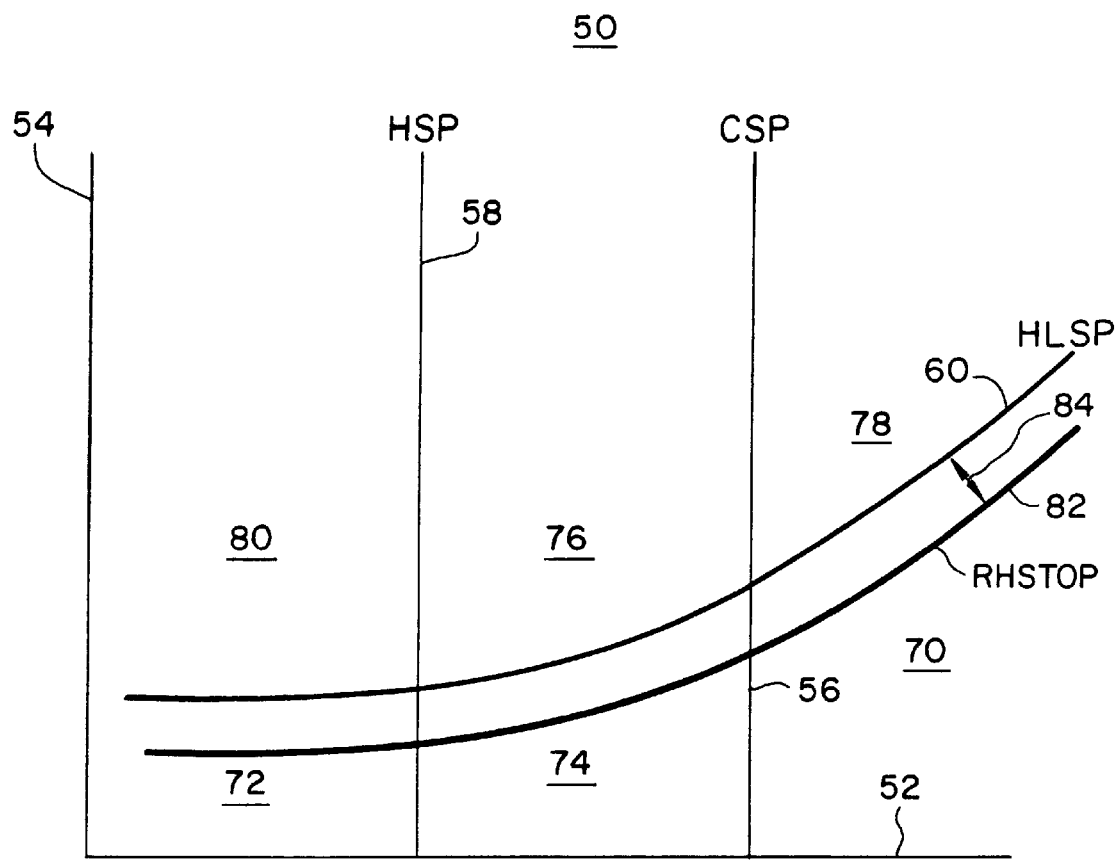
FIG. 2 is a graph of the present invention showing the HVAC system's modes of operations based on integrated temperature and humidity control.

FIG. 2 is a chart 50 of the present invention where the X-axis 52 represents a parameter to be controlled, such as air temperature, and the Y-axis 54 represents either the humidity ratio or the absolute humidity. A cooling setpoint (CSP) is represented by the line 56 and the heating setpoint (HSP) is represented by the line 58. The line 60 represents the relative humidity limit setpoint (HLSP). In accordance with the present invention, whenever the relative humidity measured by the device 28 exceeds the relative humidity limit setpoint 60, the humidity limiting mode of operation is initiated. Similarly, whenever the space temperature is greater than the cooling setpoint 56, the cooling mode of operation will be established. Whenever the space temperature is less than the heating setpoint 58, the heating mode of operation will be established. The heating and cooling modes of operation will not operate simultaneously, but either the heating mode or the cooling mode will operate with the humidity limiting mode of operation because the humidity limiting mode of operation is integrated with and incorporates either the heating or cooling mode of operation in its own operation.

For purposes of this application, the terminology referencing the control of relative humidity includes controlling absolute humidity, the humidity ratio, and other conventional measures of humidity. In practice, the principal method of controlling relative humidity is through dehumidification. Dehumidification refers to removing water vapor from the air, whereas the control of relative humidity also includes increasing the temperature of the air without removing water vapor. Dehumidification is primarily accomplished by operating the cooling system at full capacity and modulating reheat to maintain the zone temperature at the cooling setpoint. For most situations, only minimum outside air ventilation is used during dehumidification in contrast to normal cooling which may use an increased volume of outdoor air, i.e. economizing.

If the zone 10 temperature is initially cool and humidity limiting action (HLA) is required, relative humidity control by heating is first used. Heating the air decreases the relative humidity although the amount of water vapor in the air remains the same. As the zone 10 warms, a transition to the dehumidification by cooling with reheat occurs if the humidity limiting control remains unsatisfied. If dehumidification by heating satisfies the zone's needs, the dehumidification mode is exited. This ensures that cooling operation occurs in the regions where the equipment was designed and selected for that operation. For split heating and cooling setpoints, the temporary temperature setpoint is gradually increased during humidity limiting control from an initial setpoint based on a zone condition to the cooling setpoint. A fluid transition between modes of operation to the more efficient dehumidification by cooling control is therefore assured. In the case of dehumidification by cooling with reheat, if the zone temperature decreases so that cooling capacity is not required, then cooling capacity is reduced and a transition to dehumidification by heating is made.

The area 70 of the chart 50 represents the conventional cooling operation of the HVAC system 12, the area 72 represents the conventional heating operation of the HVAC system 12, and the area 74 represents a deadband where neither cooling, heating or humidity limiting action occurs. A RHSTOP line 82 is preferably provided below the relative humidity limit setpoint 60 to terminate humidity limiting operations and to avoid oscillations about the HLSP line 60. Humidity limiting action occurs above the relative humidity limit setpoint 60 and, once humidity limiting action is initiated, occurs in the area 84 between the relative humidity limit setpoint 60 and the RHSTOP line 82. Once initiated, humidity limiting action continues until the relative humidity falls below the RHSTOP line 82.

In a conventional system, unlike the present invention, heating or cooling operations do not control zone temperature between the heating setpoint 58 and the cooling setpoint 56 as represented by the combined areas 74 and 76. When in area 76, cooling capacity operations function in response to a humidistat. As zone subcooling occurs as evidenced by area 80, reheat is added to maintain the heating setpoint 58. In contrast, the present invention contemplates that integrated HVAC and humidity limiting operations will occur whenever the relative humidity exceeds the relative humidity limit setpoint 60 and will continue to take place until the relative humidity is less than the RHSTOP limit 82. Thus humidity limiting action will occur in the areas 76, 78 and 80. Particularly unique is the fact that the HVAC system 12 will operate in the area 76 to maintain zone temperature during humidity limiting actions.

How humidity is limited in the area 76 will initially depend on the last active mode of heating or cooling operation. For example, if the area 76 is entered from the area 70, from the area 78 or from the area 70 by way of the area 74, humidity limitation will initially be addressed by cooling. However, if the area 76 is entered from the area 80, from the area 72 or from the area 74 by way of the area 72, humidity control will initially be addressed by heating.

Figure 3:
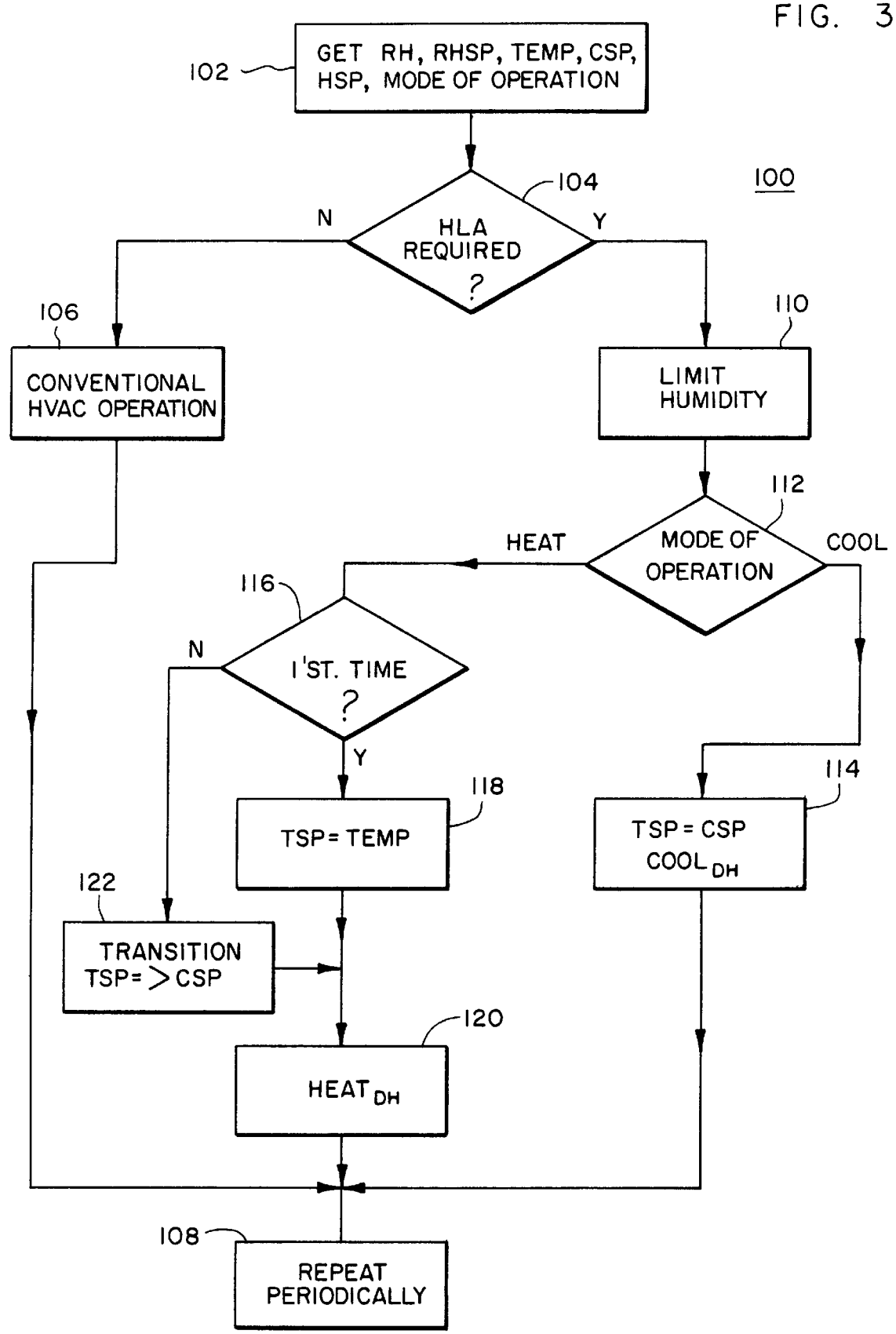
FIG. 3 is a flow chart of the operation of the present invention.

This is demonstrated in FIG. 3 where a flow chart 100 of the operation of the present invention, preferably as implemented in the controller 24, is shown. The flow chart 100 is entered either on a periodic basis or an event driven basis. A periodic basis is typically driven by a timer, while an event driven basis is a measurable change in relative humidity, a measurable change in zone temperature, a measurable change in one of the setpoints or limits, a command from a building automation system, or the like.

In the initial step of FIG. 3, as shown by block 102, the relative humidity, the relative humidity limit, the zone temperature, the cooling setpoint, the heating setpoint, and the mode of operation are determined or updated. Relative humidity and zone temperature are obtained from sensors in the device(s) 28 as are the relative humidity limit, cooling setpoint and heating setpoint. The mode of operation is either reduction of relative humidity by heating or by cooling as previously discussed.

At step 104 a determination is made as to whether humidity limiting action (HLA) is required. In doing so, relative humidity is compared to the relative humidity limit, or, if relative humidity control is already ongoing, the relative humidity is compared to the RHSTOP line 82. If relative humidity does not exceed the relative humidity limit 60, or if ongoing relative humidity control has dropped below the RHSTOP line 82, then conventional HVAC operations are continued at block 106 and the routine exited at block 108 until the next repetition of the flow chart 100.

However, if step 104 determined that the relative humidity had exceeded the relative humidity limit 60 and still exceeds the RHSTOP line 82, then the humidity limiting action is initiated or continued at step 110. Initially, the HVAC mode of operation is checked at step 112 to determine whether heating or cooling is the last mode of operation for the HVAC system 12. If step 112 determines that cooling is the last mode of operation, then step 114 is selected next to dehumidify by cooling.

At step 114, a temporary temperature setpoint (TSP) is set equal to the cooling setpoint, and the HVAC system 12 is operated in the cooling mode of operation to reduce the relative humidity while maintaining the zone temperature at the temporary temperature setpoint. If in the unoccupied mode of operation and the zone temperature is greater than the unoccupied cooling setpoint UCSP 350 or less than the unoccupied heating setpoint 352 (see FIG. 9), there is no immediate urgency to meet the cooling setpoint 56. In that case, the temporary temperature setpoint TSP is set equal to the zone temperature, but limited by the unoccupied cooling setpoint 350 and the unoccupied heating setpoint 352, and the temporary temperature setpoint gradually modified to the cooling setpoint 56. The operation of the flow chart 100 is repeated until humidity is brought under control, preferably by reducing relative humidity below the separate relative humidity stop limit RHSTOP 82.

If step 112 determines that the heating mode of operation was the last mode of operation for the HVAC system 12, then a check is made at step 116 to determine if this is the first time through the reduction of relative humidity by the heating mode of operation. If it is the first time that humidity limiting operation has been called for, then the temporary temperature setpoint (TSP) is established at block 118 based upon a zone condition. This zone condition is zone temperature in the preferred embodiment. Preferably, the temporary setpoint is bounded (and thereafter limited) under occupied conditions by upper and lower limits such as the cooling and heating setpoints. In the exceptional case, where the heating setpoint and the cooling setpoint are the same, the transition of the temporary setpoint has no effect. The HVAC system 12 is then operated at step 120 to limit relative humidity by heating while maintaining the temporary temperature setpoint TSP.

If step 116 determined that a temporary temperature setpoint (TSP) had already been established for reduction of relative humidity by heating, then block 122 is executed. In block 122 the temporary temperature setpoint TSP is gradually modified toward the cooling setpoint 56. This can be done by setting the temporary temperature setpoint equal to itself plus a modification factor. For example, the modification factor is calculated using a fixed rate, preferably 3° F. per hour. After a number of executions of step 122, the temporary temperature setpoint (TSP) will be equal to the cooling setpoint 56. This ensures a smooth transition for the temperature controller.

Effectively, the operation of the flow chart 100 will operate to reduce the relative humidity while maintaining the zone temperature or other zone condition.

Returning to FIG. 2, the present invention contemplates basically four control modes to control the temperature and humidity in a zone such as that shown in FIG. 1. Conventional dry bulb cooling is used to control when in the area 70, this dry bulb cooling control being solely based on the dry bulb temperature of the zone and not intentionally altering the amount of water vapor in the air. Similarly, conventional dry bulb heating is used in the area 72 where the dry bulb temperature of the zone is used as the criteria for conditioning the air and where the amount of water vapor in the air essentially does not vary. Area 80 uses a third control mode, limiting relative humidity by heating and acts to control both relative humidity and dry bulb temperature. Area 78 reflects a fourth control mode where dehumidification by cooling is accomplished based on controlling dry bulb temperature and relative humidity. In this fourth control mode reheat may be temporarily used to bring the temperature back up after cooling is used for dehumidification. For purposes of this application, cooling plus reheat includes both the modulation of reheat with full capacity cooling and the cycling of cooling with full capacity reheat. The reheat function is running but is not used unless needed, i.e. is used only if either the zone 10 or the supply air temperature gets too cold.

Area 76 is an area of overlap where relative humidity limiting action by heating, dehumidification by cooling, and dehumidification by cooling with reheat can all occur. When humidity is brought under control when operating relative humidity control by cooling and reheat, conventional dry bulb cooling resumes. When humidity is brought under control when operating heating, conventional dry bulb heating resumes. If initially in cooling, relative humidity control by cooling and reheat is used. If initially in heating, relative humidity control by heating is used.

Relative humidity control by heating is used until the temperature of the zone 10 is in the range where dehumidification by cooling equipment is intended. A transition from relative humidity control by heating to dehumidification by cooling is made based upon the difference error between the zone temperature and the cooling setpoint. This difference error is compared to the cooling setpoint minus 2° F. and the comparison result is integrated over time until the integrated value passes a threshold. This threshold is empirically established and triggers the transition to dehumidification by cooling once the integration value passes the threshold.

If initially in cooling, relative humidity control by cooling and reheat is used. When dehumidification by cooling with reheat is ongoing, and reheat is ineffective to maintain the zone temperature, a transition to relative humidity control by heating may occur. This is determined by comparing the difference error between the zone temperature and the cooling setpoint with the cooling setpoint minus 3° F. The result of the comparison is integrated over time. When and if the comparison passes a second empirically determined threshold, the control mode is switched from dehumidification by cooling and reheat to relative humidity control by heating.

Figure 4:
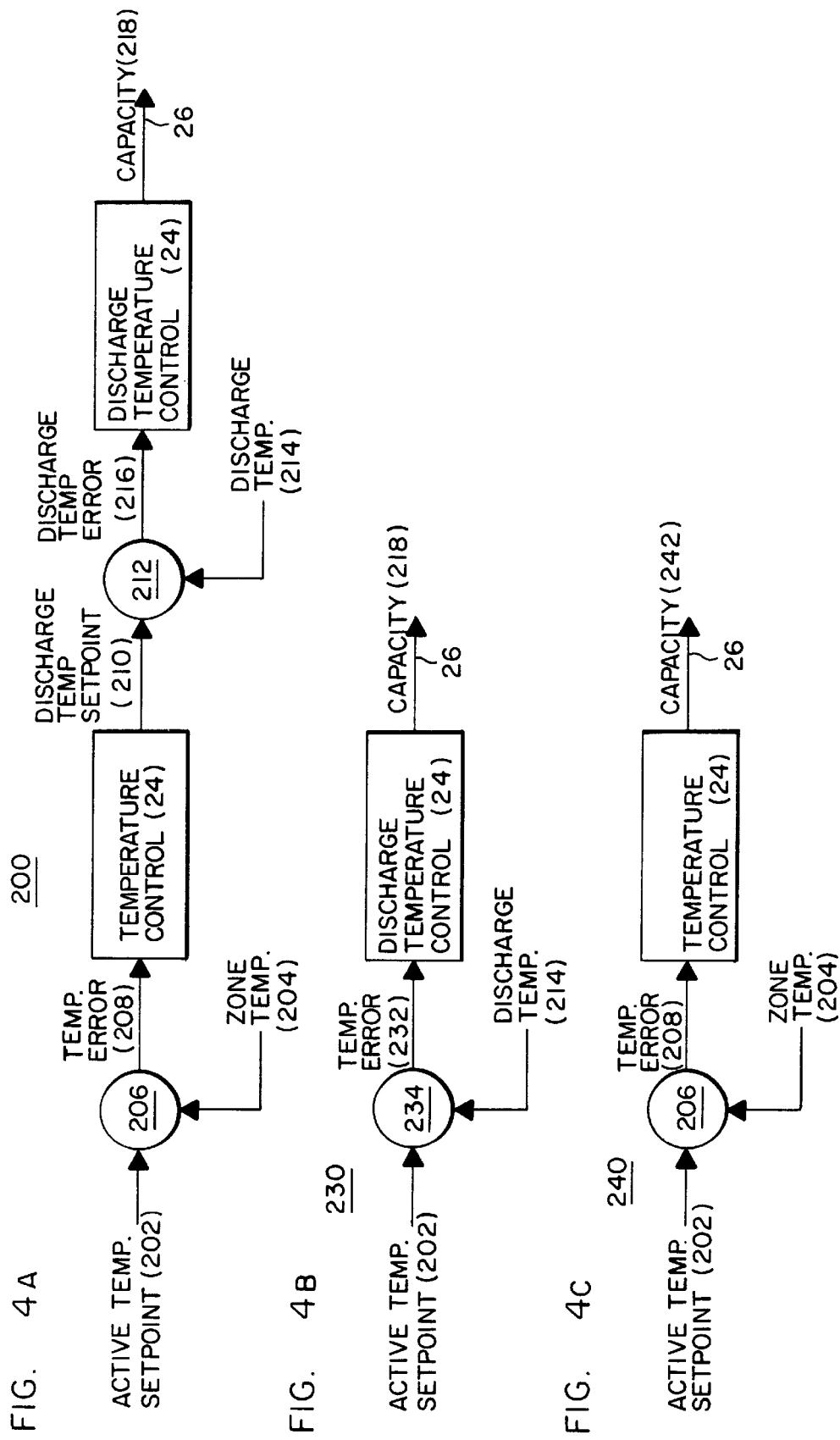
FIGS. 4a, b and c are control diagrams used in the present invention.
FIG. 4b shows a discharge air control.
FIG. 4c shows a zone air temperature control.

FIG. 4 shows three different control variations using proportional integral control loops which are supported by the present invention. For the cascade or discharge air control variations, the zone condition is implied by the discharge conditions. Normally, dehumidification by cooling operates the cooling system at full capacity or at a fixed capacity level and controls reheat to maintain the required temperature condition. If loss of discharge air temperature control is detected due to inadequate reheat capacity, an alternate control sequence is invoked which requires cooling capacity to operate in an on/off mode, and reheat operates at a full capacity level or at a fixed capacity level in order to maintain the required temperature condition. This allows cooling capacity to provide dehumidification efficiently while working with reheat to maintain the desired condition. Only one of these control variations is operable at any given time.

FIG. 4a shows a cascade control where both unit capacity and discharge temperature are controlled to satisfy the zone temperature setpoint. FIG. 4b shows a discharge air control where unit capacity is controlled to satisfy the discharge temperature setpoint. FIG. 4c shows a zone control where capacity is controlled to satisfy the zone temperature setpoint. If zone temperature and discharge temperature are available, the cascade control is always used. If only the zone temperature is available, then the zone temperature control is used. If only the discharge temperature is available, then the discharge control is used. The control variations are discussed in more detail as follows.

With reference to the cascade control shown in FIG. 4a, the control diagram is shown as 200. The active temperature setpoint 202 and the zone temperature 204 as respectively determined and measured by the device 28, are compared at 206 and a temperature error 208 is forwarded to the controller 24. The controller 24 is preferably a conventional proportional/integral control algorithm which produces a discharge temperature requirement. In FIG. 4a, this discharge temperature requirement is the discharge temperature setpoint 210. The discharge temperature setpoint 210 is compared at 212 with the discharge air temperature 214 as measured by the discharge air sensor 30 to determine a discharge temperature error 216. The discharge temperature error 216 is forwarded to the controller 24 which determines a capacity requirement 218 and forwards that requirement to the air handler 14. The air handler 14 then provides heating or cooling to the commanded capacity. The discharge temperature control is also preferably a conventional proportional/integral control algorithm. By controlling the discharge air temperature to a setpoint calculated by the controller 24, the discharge air temperature control is maintained when transitioning between the control modes. Zone temperature fluctuations are therefore reduced.

The discharge air temperature control is shown as 230 in FIG. 4b. The discharge air temperature control functions when no zone temperature inputs are available or when the air supply is to be maintained at a fixed value. The discharge air temperature setpoint is provided either through the device 28 or through a building automation system. In FIG. 4b, the active temperature setpoint 202 as determined by the device 28 or by a building automation system is compared at 234 with the discharge temperature 214 as determined by the discharge air sensor 30 to determine a discharge temperature error 232. This discharge temperature error 232 is used by the controller 24 to determine a capacity requirement for use by the air handler 14. If a modulating output air handler is in use, the capacity requirement is translated to a position. If the air handler has on/off output, the controller 24 produces a percent capacity requirement which is converted to on/off decisions using a staging/state map dependent on the number of stage outputs and the type of outputs present.

Referring to FIG. 4(c), a zone air temperature control 240 is used if the zone temperature 204 is available from a device such as the device 28 but the discharge air temperature is not available from the sensor 30. The active temperature setpoint 202 is compared at 206 with the zone temperature 204 to determine a zone temperature error 208. The controller 24 uses the zone temperature error 208 to determine a capacity requirement 242 and forwards that capacity requirement to the air handler 14 by means of an electrical connection 44. The capacity requirement 242 is a position for continuously modulating outputs and is a percent capacity requirement for on/off outputs. The percent capacity requirement is converted to a pulse width modulating output. The frequency of output is determined by a user configured cycles per hour which, together with the percentage capacity, is used to determine a duty cycle.

Figure 5:
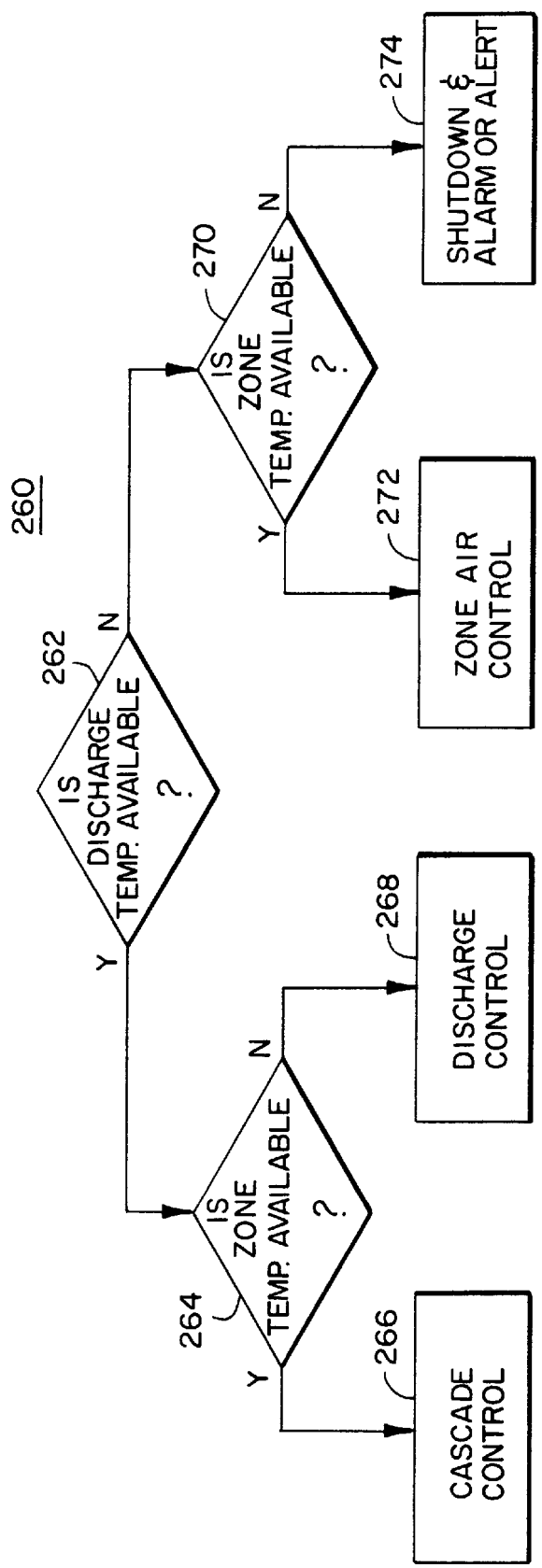
FIG. 5 is a flow chart showing how the modes of operation of FIG. 4 are selected.

FIG. 5 shows how the controls of FIG. 4 are selected for the preferred embodiment, recognizing that other arrangements may be selected for other embodiments in accordance with customer desires or application needs. Further details of the preferred embodiment and details of alternative embodiments may be found in commonly assigned U.S. Pat. Nos. 5,237,826 to Baldwin et al. and 5,276,630 to Baldwin et al., both of which are hereby incorporated by reference.

FIG. 5 is a flow chart 260 which begins at 262 by determining if the discharge air temperature is available from the discharge air sensor 30. If the discharge temperature is available, then a determination is made at 264 as to whether the zone temperature is available from the zone temperature sensor. If both the zone temperature and the discharge air temperature are available, then the cascade control of FIG. 4a is executed at block 266. If the discharge air temperature is available but the zone temperature is not available as determined by block 264, then the discharge control of FIG. 4b is entered at block 268.

If block 262 determined that the discharge temperature was not available, then a determination is made at block 270 as to whether zone temperature is available. If the zone temperature is available but the discharge air temperature is not, then the zone air control of FIG. 4c is executed at block 272. If neither zone temperature or discharge air temperature is available, then block 274 is entered, the air handler 14 is shut down, and an alarm or an operator alert is generated.

Figure 6:
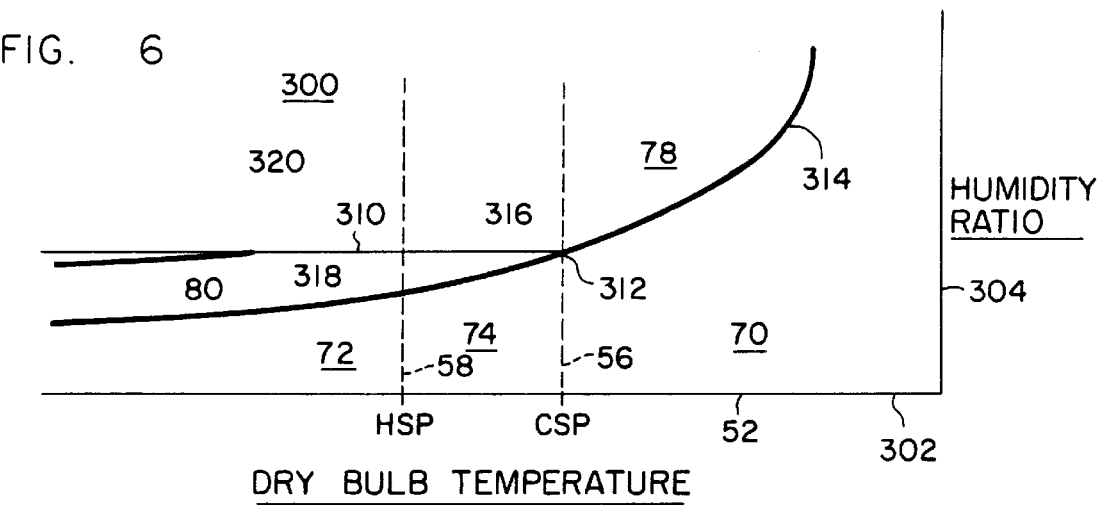
FIG. 6 is a graph of the HVAC system's modes of operation based on an alternative dewpoint control embodiment.

FIG. 6 illustrates an alternative embodiment of the present invention directed to the use of dewpoint control for occupied operations where like reference numerals are used to identify previously discussed elements. For simplicities sake, the RHSTOP line 82 and the humidity limit setpoint 60 are collectively shown as a humidity action line 314 in FIGS. 6, 7 and 8. In the preferred embodiment, the humidity limit setpoint 60 and the RHSTOP line 82 will be implemented in FIGS. 6, 7 and 8 as previously described.

FIG. 6 shows a graph 300 of dry bulb temperature 302 versus humidity or humidity ratio 304. A dewpoint setpoint line (DSP) 310 is initially established starting from the intersection 312 of the cooling setpoint 56 and the relative humidity limit setpoint 60 and extending leftwardly, preferably determined by use of a psychrometric chart or its equivalent. A zone dewpoint is determined from zone temperature and the zone relative humidity, also preferably by use of a psychrometric chart or its equivalent. These dewpoint values are used with other variables to operate heating, cooling, or cooling with reheat capacity whenever there is a call for humidity limiting action. Thus humidity limiting action occurs whenever the relative humidity is greater than the humidity action line 314, and dewpoint limiting action (DLA) occurs whenever the dewpoint is greater than the dewpoint limit 310.

The control modes of FIG. 6 are initially established as follows: If the zone temperature is greater than the cooling setpoint 56 and the measured humidity is less than the humidity action line 314, the dry bulb cooling control mode 70 is used.

If the zone temperature is greater than the cooling setpoint 56 and humidity limiting action is required because the humidity is greater than the humidity action line 314, then the dehumidification by cooling control mode is used in the area 78. If the zone temperature is in the area 74 between the heating setpoint 58 and the cooling setpoint 56 and the humidity is below the humidity action line 314, then no air conditioning actions are required. If the zone temperature is below the heating setpoint 58 and the humidity is below the humidity action line 314, then the dry bulb heating control mode is used in the area 72.

The focus of the alternative embodiment relative to dewpoint is in the remaining area of the graph. If the dewpoint is under control but the relative humidity is out of control, i.e. the zone dewpoint is less than the dewpoint line 310 but greater than the humidity action line 314, then it is possible to use the control mode of relative humidity by heating 80 to satisfy the zone's temperature and humidity needs. However, if the humidity is greater than the zone dewpoint line 310, then relative humidity control by heating will not satisfy the zone's humidity needs since the relative humidity by heating control mode does not remove water vapor from the air. This is shown by area 316. When in the area 316, dehumidification by cooling is used with reheat to control the zone's temperature and humidity.

Essentially, this alternative embodiment determines that the dewpoint is too high to be controlled by heating and uses dehumidification by cooling with reheat instead. The dewpoint line 310 is used to modify the region 80 of the embodiment of FIG. 2. In the embodiment of FIG. 2, relative humidity control by heating could be acceptable whenever humidity limiting action was called for and the zone temperature was low. The dewpoint alternative embodiment divides that region 80 into a region 318 where relative humidity control by heating is effective and into a region 320 where relative humidity control by heating is not effective to control humidity but is only effective to control zone temperature. The dewpoint control embodiment has advantages over the preferred embodiment in that it accurately identifies equipment and zone operating conditions. The dewpoint condition is a better control parameter to invoke the zone dehumidification control modes because it indicates required equipment dehumidification effectiveness.

The air entering an air handler consists of a combination of air returned from the building space and air from an outside source. An entering air dewpoint is calculated from the temperature and humidity of the air entering the air handler. An additional check can be made to confirm the air handler's capability to dehumidify by comparing the entering air dewpoint with the entering chilled water temperature from a system such as previously incorporated by reference U.S. Pat. No. 5,419,146. If the entering chilled water temperature is sufficiently lower than the entering air dewpoint, then the air handler 14 can dehumidify. Otherwise the air handler cannot dehumidify. This additional check is functional for both embodiments. In the case of multiple zone systems, the entering water temperature should be less than the minimum entering air dewpoint of all the air handlers to support dehumidification ability in all zones. The leaving water temperature of a chiller system such as shown in previously referenced U.S. Pat. No. 5,419,146 should be controlled sufficiently low so that the entering water temperature entering the air handling means is less than minimum entering air dewpoint for all air handling means.

Figure 7:
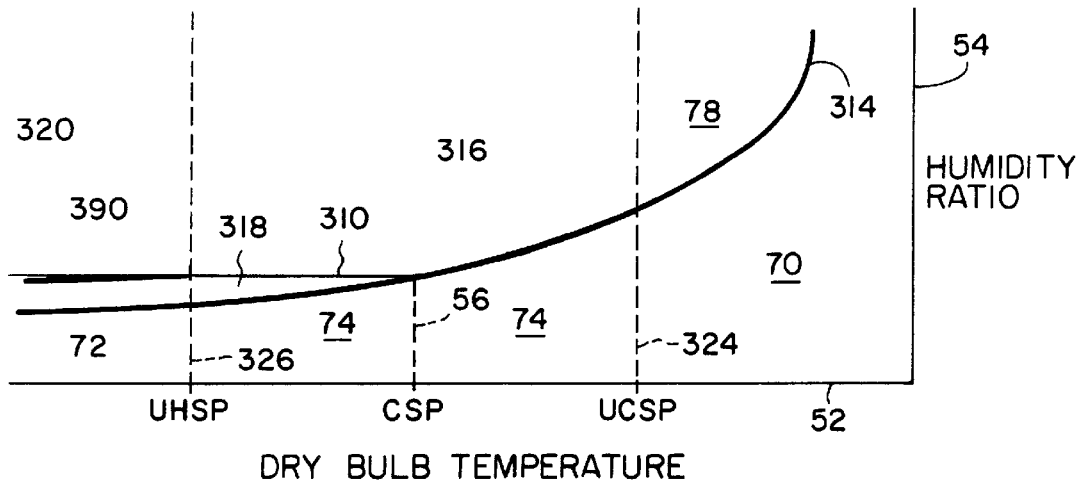
FIG. 7 is a graph of the dewpoint control embodiment for unoccupied modes of operation.
Figure 8:
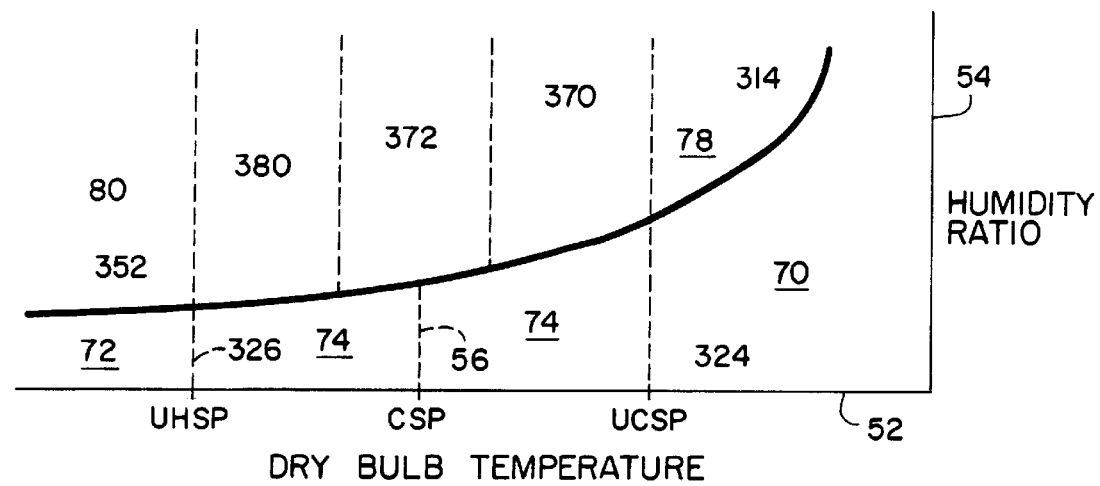
FIG. 8 is a graph of the temperature control embodiment of FIG. 2 for unoccupied modes of operation.

FIG. 7 and 8 illustrate the unoccupied versions of FIGS. 6 and 2 respectively. The unoccupied strategy is similar to the occupied strategy but less aggressive in its actions. The discussion following with regard to FIGS. 7 and 8 assumes that the humidity action line 314 has been exceeded.

FIG. 7 illustrates the dewpoint control embodiment for unoccupied operation and includes an unoccupied cooling setpoint 324 which is greater in temperature than the cooling setpoint 56, and includes an unoccupied heating setpoint 326 which is lower in temperature than the cooling setpoint 56.

FIG. 7 is generally similar to FIG. 6 and like reference numerals are used for like elements. The primary additions are the use of the unoccupied cooling setpoint 324 and the unoccupied heating setpoint 326. The area of inaction 74 occurs when humidity is below the humidity action line 314 and when temperature is between the unoccupied heating setpoint 326 and the unoccupied cooling setpoint 324. If the zone temperature exceeds the unoccupied cooling setpoint 324 and the humidity is below the humidity action line 314, then the conventional dry bulb cooling control mode is used as shown by the area 70. On the other hand, if the temperature is greater than the unoccupied cooling setpoint 324 and the humidity is also greater than the humidity action line 314, then the dehumidification by cooling control mode of operation is used as shown by the area 78. If the zone temperature is less than the unoccupied heating setpoint 326 and if the humidity is also less than the humidity action line 314, then conventional dry bulb heating is used as shown by the area 72. Relative humidity control by heating is only used in the area 318 where the humidity is greater than the humidity action line 314 and where the humidity is less than the zone dewpoint line 310. Otherwise, dehumidification by cooling or dehumidification by cooling with reheat is used in the area 316 where the temperature is less than the unoccupied cooling setpoint 324, where the zone dewpoint is greater than the zone dewpoint line 310, and where the relative humidity is greater than the humidity action line 314.

It is preferable that the unoccupied modes of operation do not use the discharge sensor since a cruder control based solely on the zone temperature is acceptable for unoccupied operations. Thus, the unoccupied modes of FIGS. 7 and 8 preferably use the control logic of FIG. 4C in their operation.

FIG. 8 is the unoccupied version of FIG. 2. In FIG. 8, the dry bulb heating control mode occurs in the area 72 where the humidity is below the humidity action line 314 and when the temperature is below the unoccupied heating setpoint 326. The dry bulb cooling control mode occurs in the area 70 where the temperature is greater than the unoccupied cooling setpoint 324 and the humidity is less than the humidity action line 314. Dehumidification by cooling occurs when the temperature is greater than the unoccupied cooling setpoint 324 and the humidity is greater than the humidity action line 314 as shown by area 78. Control of relative humidity by heating occurs in the area 80 where temperature is less than the unoccupied heating setpoint 326 and where the humidity is greater than the humidity action line 314. No action is taken in the area 74 when humidity is below the humidity action line 314 and when the temperature is between the unoccupied heating setpoint 326 and the unoccupied cooling setpoint 324. When the temperature is between the unoccupied heating setpoint 326 and the unoccupied cooling setpoint 324, and the humidity is greater than the humidity action line 314, then any of the control modes of relative humidity by heating, dehumidification by cooling, or dehumidification by cooling with reheat are active. In FIG. 8, the zones 370, 372 and 380 are for explanatory purposes only and do not accurately represent the transitions between those areas since they occur based on the integration transitions described with regard to FIG. 2. Given this, dehumidification by cooling or by cooling with reheat generally occurs in the area 370 while relative humidity control by heating generally occurs in the area 380. In the area 372 dehumidification by cooling, dehumidification by cooling with reheat, or relative humidity control by heating can all be found dependent upon zone conditions of temperature and humidity, the modes of operation, and the integration of the various errors relative to the cooling setpoint 56.

In FIG. 8, when the temperature of the zone as measured by the device 28 is between the cooling setpoint 56 and the unoccupied cooling setpoint 324 and humidity is greater than the humidity action line 314 (area 70 or part of area 372), a temporary setpoint TSP is initialized at the measured zone temperature, and full cooling with cycling reheat is used to maintain the temporary setpoint. This reduces the moisture load and hence the relative humidity without causing a substantial reduction in the dry bulb temperature.

In FIG. 8, if the humidity is greater than the humidity action line 314 and the temperature of the zone is greater than the unoccupied cooling setpoint 324 (area 78), the temperature is controlled to the unoccupied cooling setpoint 324 (preferably minus 2° F.) by driving cooling to full capacity and cycling reheat. The unoccupied cooling setpoint 324 is used as the temporary setpoint until the humidity limiting control is satisfied. This reduces the moisture load in the zone and the relative humidity, without causing a substantial reduction in the dry bulb temperature.

In FIG. 8, when the temperature in the zone is between the cooling setpoint 56 and the unoccupied heating setpoint 326 and the humidity is greater than the humidity action line 314 (area 380 or part of area 372) the temporary setpoint TSP is initialized to the zone temperature and heating capacity is cycled to maintain the temporary setpoint. The temporary setpoint is gradually increased to the occupied cooling setpoint 56. This approach is used because, since dehumidification is usually associated with cooling, system and zone equipment is sized and operated to meet the designed cooling loads so temperature is therefore controlled to the cooling setpoint. It is preferable to use the heating capacity to lower relative humidity rather than to use cooling plus reheat because cooling plus reheat may fail to provide dehumidification. Typically, there will always be adequate heating capacity to lower relative humidity by raising zone temperature. Finally, this minimizes disturbances when transitioning to the occupied mode in the zone.

In FIG. 8 when the zone temperature is less than unoccupied heating setpoint 326 and the humidity is greater than the humidity action line 314 (area 80), the temporary setpoint (TSP) is initially set equal to the unoccupied heating setpoint 326 and heating capacity is cycled to meet this temporary setpoint. The temporary setpoint is then gradually transitioned to the cooling setpoint 56 for the reasons described previously.

What has been described is a new method of reducing relative humidity while maintaining zone temperature. Various modifications and alterations to this method are contemplated. Other conditions such as occupancy, air pressure and entering water temperature are considered as conditions which can be integrated with humidity in a manner as described above with regard to dewpoint and zone temperature. All such modifications and alterations are intended to fall within the spirit and scope of the invention as set forth in the attached claims.

What is claimed as Letters Patent of the United States is as follows:

1. A method of operating an HVAC system having an HVAC control and a humidity limiting control, comprising the steps of:

determining a humidity limit for a space;

monitoring humidity in the space;

comparing the humidity to the humidity limit;

operating the conventional HVAC control if the humidity is less than or equal to the humidity limit;

integrating the HVAC control and dehumidification controls if the humidity is greater than the humidity limit;

determining an air conditioning mode of operation including an active setpoint; and operating the HVAC system to reduce the relative humidity level in the space while maintaining the active setpoint.

2. The method of claim 1 including the further steps of:

establishing the active setpoint based upon a measured space condition;

determining a cooling setpoint for the space; and transitioning the active setpoint to the cooling setpoint.

3. The method of claim 2 including the steps of:

establishing a space temperature as the measured space condition; and initially establishing the active setpoint as the space temperature.

4. The method of claim 3 including the steps of:

determining a dewpoint setpoint from the cooling setpoint and the humidity limit;

determining a dewpoint from the zone temperature and the humidity; and maintaining the zone dewpoint at or under the zone dewpoint setpoint while controlling space temperature.

5. The method of claim 4 including the further steps of:

determining an entering air dewpoint;

determining an entering water temperature;

comparing the entering air dewpoint to the entering water temperature; and providing humidity limiting control only if the entering air dewpoint is greater than the entering water temperature.

6. A method of operating an HVAC system having an HVAC control and a humidity limiting control, comprising the steps of:

determining a humidity limit for a space;

monitoring humidity in the space;

comparing the humidity to the humidity limit;

operating the conventional HVAC control if the humidity is less than or equal to the humidity limit;

integrating the HVAC control and dehumidification controls if the humidity is greater than the humidity limit;

determining an air conditioning mode of operation including an active setpoint;

operating the HVAC system to reduce the relative humidity level in the space while maintaining the active setpoint;

determining a cooling setpoint and a heating setpoint;

monitoring a temperature representative of the space; and operating the HVAC system to dehumidify by cooling or to reduce relative humidity by heating while maintaining zone temperature if the monitored temperature is between the heating and cooling setpoints and if the humidity is greater than the humidity limit.

7. The method of claim 6 including the steps of:

operating the HVAC system to dehumidify by cooling if the monitored temperature is greater than or equal to the cooling setpoint and the humidity is greater than the humidity limit; and operating the HVAC system to reduce the relative humidity by heating if the monitored temperature is less than the heating setpoint and the humidity is greater than the humidity limit.

8. The method of claim 7 wherein the integrating step includes the further step of controlling relative humidity by maintaining a condition other than humidity.

9. The method of claim 8 including the further steps of:

determining if a zone is in a cooling or heating mode of operation; and operating the air conditioning system at full capacity while modulating reheat so that the zone temperature is maintained at the cooling setpoint if the zone is in the cooling mode of operation and a humidity limiting mode of the operation has been established.

10. A method of operating an HVAC system having an HVAC control and a humidity limiting control, comprising the steps of:

determining a humidity limit for a space;

monitoring humidity in the space;

comparing the humidity to the humidity limit;

operating the conventional HVAC control if the humidity is less than or equal to the humidity limit;

integrating the HVAC control and dehumidification controls if the humidity is greater than the humidity limit;

determining an air conditioning mode of operation including an active setpoint;

operating the HVAC system to reduce the relative humidity level in the space while maintaining the active setpoint;

determining if a zone is in a cooling or heating mode of operation; and operating the air conditioning system at full capacity while modulating reheat so that the zone temperature is maintained at the cooling setpoint if the zone is in the cooling mode of operation and a humidity limiting mode of the operation has been established.

11. The method of claim 1 wherein the integrating step includes the further step of controlling relative humidity and maintaining a condition other than humidity.

12. The method of claim 1 wherein the integrating step includes the further step of controlling relative humidity by maintaining a condition other than humidity.

13. The method of claim 12 wherein the condition is air temperature, ventilation, dewpoint, air pressure or occupancy.

14. A method of operating an HVAC system having an HVAC control and a humidity limiting control, comprising the steps of:

determining a humidity limit for a space;

monitoring humidity in the space;

comparing the humidity to the humidity limit;

operating the conventional HVAC control if the humidity is less than or equal to the humidity limit;

integrating the HVAC control and dehumidification controls if the humidity is greater than the humidity limit;

determining an air conditioning mode of operation including an active setpoint;

operating the HVAC system to reduce the relative humidity level in the space while maintaining the active setpoint;

measuring a space parameter;

determining a parameter limit; and operating the HVAC system to reduce the relative humidity level in the space while controlling the deviation between the space parameter and the parameter limit.

15. The method of claim 14 including the further steps of:

limiting humidity based on both the humidity and the space parameter.

16. The method of claim 15 including the step of:

operating the HVAC system to maintain a set of humidity conditions rather than to meet a humidity operating point.

17. The method of claim 16 including the steps of:

establishing the space parameter as dry bulb temperature; and controlling humidity by allowing humidity to float within a range.

18. The method of claim 17 wherein the integrating step includes the further step of:

minimizing temperature fluctuations in the space.

19. The method of claim 17 including the further steps of:

establishing cooling and heating setpoints for the HVAC systems; and controlling both temperature and humidity in a deadband between the cooling and heating setpoints.

20. The method of claim 19 including the further steps of:

minimizing energy usage while integrating the HVAC and dehumidification controls.

21. The method of claim 14 wherein the HVAC system includes air handling means having a hydronic cooling system and the method includes the step of:

establishing an entering water temperature for the hydronic cooling system as the space parameter.

22. The method of claim 14 including the further steps of:

providing modes of operation for the HVAC system;

determining a dewpoint for the space; and switching the modes of operation based on the dewpoint.

23. The method of claim 22 wherein the modes of operation include at least heating, cooling, dehumidification by heating, and dehumidification by cooling;

wherein the dehumidification by cooling mode of operation maintains the parameter at or below the parameter limit; and wherein the dehumidification by heating mode of operation maintains the parameter at or below the parameter limit.

24. The method of claim 23 the further steps of:

establishing a temporary setpoint as a function of the space parameter; and using the temporary setpoint to transition from dehumidification by heating to dehumidification by cooling.

25. The method of claim 24 including the step of:

controlling the HVAC system to maintain the parameter to the temporary setpoint; and gradually modifying the temporary setpoint.

26. A method of limiting humidity in a space whose air is conditioned by equipment having at least a heating mode of operation, the method comprising the steps of:

determining a mode of operation for the space;

determining a relative humidity limit and a space relative humidity;

initiating humidity control if the relative humidity is greater than the relative humidity limit; and controlling humidity using the heating mode of operation and a transitional setpoint if the mode of operation for the space is heating.

27. The method of claim 26 including the further steps of:

initially establishing the transitional setpoint based on a measured space condition;

determining a cooling setpoint for the space; and thereafter modifying the transitional setpoint to the cooling setpoint.

28. The method of claim 26 including the steps of:

monitoring a space condition;

determining a cooling setpoint; and determining a transitional setpoint dependent upon the mode of operation for the space;

wherein the transitional setpoint is based on the cooling setpoint if the mode of operation for the space is cooling and wherein the transitional setpoint is initially based on the monitored condition if the mode of operation is heating.

29. The method of claim 28 wherein, if the mode of operation is heating, the transitional setpoint is incrementally adjusted from the monitored condition to the cooling setpoint.

30. The method of claim 29 including the steps of measuring a space temperature and establishing the space temperature as the monitored condition.

31. The method of claim 30 including the steps of:

determining a dewpoint setpoint from the cooling setpoint and the relative humidity limit;

determining a dewpoint from the monitored space temperature and the monitored relative humidity; and maintaining the dewpoint at or under the dewpoint setpoint while dehumidifying.

32. A method of switching between heating, cooling and humidity limiting modes of operation while conditioning the air in a zone of an HVAC system comprising the steps of:

determining a dewpoint setpoint;

monitoring a relative humidity;

determining a relative humidity limit;

establishing a humidity limiting mode of operation if the relative humidity is greater than or equal to the relative humidity limit; and maintaining a dewpoint at or under the dewpoint setpoint while limiting humidity.

33. The method of claim 32 including the further steps of:

monitoring a zone temperature;

determining a cooling setpoint;

determining the dewpoint setpoint from the cooling setpoint and the relative humidity limit; and determining the dewpoint from the zone temperature and the relative humidity.

34. A method of switching between heating, cooling and humidity limiting modes of operation while conditioning the air in a zone of an HVAC system comprising the steps of:

determining a dewpoint setpoint;

monitoring a relative humidity;

determining a relative humidity limit;

establishing a humidity limiting mode of operation if the relative humidity is greater than or equal to the relative humidity limit;

maintaining a dewpoint at or under the dewpoint setpoint while limiting humidity;

monitoring a zone temperature;

determining a cooling setpoint;

determining the dewpoint setpoint from the cooling setpoint and the relative humidity limit;

determining the dewpoint from the zone temperature and the relative humidity;

determining an entering air dewpoint for air entering an air handler;

monitoring an entering water temperature;

comparing the entering air dewpoint to the entering water temperature; and providing humidity limiting control only if the entering water temperature is sufficiently less than the entering air dewpoint.

35. The method of claim 34 including the further step of limiting humidity only if the entering water temperature is less than a minimum of the entering air dewpoints established from a plurality of zones.

36. The method of claim 35 further including the step of:

requiring that the entering water temperature be less than the minimum entering air dewpoint of the plurality of air handling units.

37. A method of controlling an HVAC system comprising the steps of:

determining an active setpoint;

monitoring a condition to be controlled;

comparing the active setpoint with the monitored condition to determine a condition error;

using the condition error to determine a discharge temperature setpoint;

determining a discharge air temperature;

comparing the discharge temperature setpoint to the discharge temperature to determine a discharge temperature error;

using the discharge temperature error to control the capacity of the HVAC system; and substituting the active setpoint for the discharge temperature setpoint whenever the monitored condition is not available.

38. The method of claim 37 wherein the active setpoint is a temperature setpoint and the monitored condition is temperature.

39. A method of controlling an HVAC system comprising the steps of:

determining an active setpoint;

monitoring a condition to be controlled;

comparing the active setpoint with the monitored condition to determine a condition error;

using the condition error to determine a discharge temperature setpoint;

determining a discharge air temperature;

comparing the discharge temperature setpoint to the discharge temperature to determine a discharge temperature error;

using the discharge temperature error to control the capacity of the HVAC system if the discharge temperature is available; and using the default condition error to determine a capacity for the air conditioning system if the discharge temperature is not available.

40. The method of claim 39 wherein the active setpoint is a temperature setpoint and the monitored condition is temperature.

41. A method of controlling temperature and humidity in a building comprising the steps of:

determining cooling and heating temperature setpoints;

determining a relative humidity limit;

determining a building temperature;

comparing the building temperature to the active setpoint to establish a temperature error;

determining an active setpoint of the cooling and heating setpoints;

operating an air conditioning system to maintain an acceptable temperature error;

determining building relative humidity;

comparing the building relative humidity to the relative humidity limit to establish a relative humidity error;

operating an air conditioning system to maintain an acceptable humidity error;

setting a mode of operation as heating if the temperature is less than the heating setpoint;

setting a mode of operation as cooling if the temperature is greater than the cooling setpoint;

determining a zone condition;

dehumidifying until the zone condition reaches the cooling setpoint if the mode of operation is cooling; and limiting humidity until the zone condition reaches a transitional value if the mode of operation is heating;

wherein the transitional value is initially the zone condition and wherein the transitional value is periodically and incrementally adjusted to the cooling setpoint.

42. An integrated humidity and air conditioning system conditioning air by heating or cooling comprising:

a humidity sensor;

air conditioning means;

a zone condition sensor; and a controller operably connected to the humidity sensor, the air conditioning means and the zone condition sensor, and operable to control the air conditioning means in response to the sensed zone condition and the sensed humidity;

the controller including at least first, second, third, and fourth control modes, an overlap control mode, a humidity limit, a first zone condition limit, and a second zone condition limit;

the first control mode being operable when the zone condition is greater than the first zone condition limit and the sensed humidity is less than the humidity limit, the first control mode operating the air conditioning means to condition air by cooling in response to the sensed zone condition;

the second control mode being operable in response to the sensed zone condition being less than the second zone condition limit and the sensed humidity being less than the humidity limit, the second control mode operating the air conditioning means by heating in response to the sensed zone condition;

a third control mode being operable when the zone condition is less than the second zone condition limit and the humidity is greater than the humidity limit, the third control mode operating the air conditioning means by heating in response to the sensed humidity and the sensed zone condition;

the fourth control mode being operable when the sensed zone condition is greater than the first zone condition limit and the sensed humidity is greater than the humidity limit, the fourth control mode operating the air conditioning means to condition air by cooling in response to the sensed humidity and the sensed zone condition; and the overlap control mode being operable in response to the sensed zone condition being greater than the second zone condition limit and less than the first zone condition limit and the sensed humidity being greater than the humidity limit, the overlap control mode operating the air conditioning means by either heating, cooling, or both in response to both the sensed humidity and the sensed zone condition.

43. The system of claim 42 wherein the sensed zone condition is temperature or dewpoint.

44. The system of claim 43 wherein the air conditioning means include air handler means receiving chiller water, the chilled water having an entering water temperature, the controller monitoring the entering water temperature, comparing the entering water temperature to the dewpoint, and precluding operation of the second, third and overlap control modes unless the dewpoint is greater than the entering water temperature.

45. A humidity control system comprising:

air handler means;

a humidity sensor;

a temperature sensor;

a controller operably connected to the air handler means, the humidity sensor, and the temperature sensor;

the controller including a heating setpoint, a cooling setpoint, and a humidity limit, the controller being operable, whenever the humidity exceeds the humidity level and the temperature is less than the cooling setpoint, to control relative humidity using the air handler means; and the controller establishing a temporary setpoint initially at the measured temperature and controlling the air handler means to reduce the relative humidity while maintaining the temporary setpoint.

46. The control system of claim 45 wherein the controller gradually transitions the temporary setpoint from the initial temperature to the cooling setpoint.

47. A method of determining when to limit humidity in an HVAC chiller system having air handling means and a hydronic system providing conditions fluid to the air handling means, the method comprising the steps of:

determining an entering air dewpoint of air entering the air handling means;

determining a conditioned fluid temperature of conditioned fluid being provided to the air handling means; and allowing humidity limiting action only if the conditioned fluid temperature is less than the entering air dewpoint.

* * * * *

UNITED STATES PATENT AND TRADEMARK OFFICE
CERTIFICATE OF CORRECTION

PATENT NO. : 5,915,473
DATED : June 29, 1999
INVENTOR(S) : Radhakrishna Ganesh, Thomas J. Clanin and David M. Foye It is certified that error appears in the above-identified patent and that said Letters Patent is hereby corrected as shown below:

Column 9, Line 43, "FIG. 9" should read --FIG. 8--.

Signed and Sealed this

Ninth Day of November, 1999

*Attest:*

*Attesting Officer*

Q. TODD DICKINSON

*Acting Commissioner of Patents and Trademarks*